(12) United States Patent
Kinoshita

(10) Patent No.: US 11,494,134 B2
(45) Date of Patent: Nov. 8, 2022

(54) INFORMATION PROCESSING APPARATUS, INFORMATION PROCESSING SYSTEM, INFORMATION PROCESSING METHOD, AND STORAGE MEDIUM

(71) Applicant: Hidenori Kinoshita, Tokyo (JP)

(72) Inventor: Hidenori Kinoshita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/962,096

(22) PCT Filed: Feb. 27, 2019

(86) PCT No.: PCT/JP2019/007619
§ 371 (c)(1),
(2) Date: Jul. 14, 2020

(87) PCT Pub. No.: WO2019/172050
PCT Pub. Date: Sep. 12, 2019

(65) Prior Publication Data
US 2020/0341699 A1    Oct. 29, 2020

(30) Foreign Application Priority Data
Mar. 5, 2018 (JP) .............................. JP2018-039121

(51) Int. Cl.
*G06F 3/12* (2006.01)
(52) U.S. Cl.
CPC .......... *G06F 3/1207* (2013.01); *G06F 3/1241* (2013.01); *G06F 3/1261* (2013.01); *G06F 3/1285* (2013.01)
(58) Field of Classification Search
None
See application file for complete search history.

(56) References Cited

U.S. PATENT DOCUMENTS 5,547,178 A * 8/1996 Costello ............. G03G 15/6538
270/52.02
7,061,635 B1 * 6/2006 Wanda .................. G06F 3/1213
358/1.1
(Continued)

FOREIGN PATENT DOCUMENTS

CN    101582016 A    11/2009
CN    101593088 A    12/2009
(Continued)

OTHER PUBLICATIONS

Korean Office Action dated Aug. 18, 2021, corresponding to Korean Patent Application Publication No. 10-2020-7018274.
(Continued)

*Primary Examiner* — Fan Zhang
(74) *Attorney, Agent, or Firm* — Harness, Dickey & Pierce, P.L.C.

(57) ABSTRACT

An information processing apparatus includes a print management unit configured to allocate a plurality of print data sets to a plurality of image forming apparatuses, respectively, the plurality of print data sets being obtained by dividing one print data set; a separator data generation unit configured to generate, for each of the plurality of image forming apparatuses, print data for a separator, the print data for the separator including management information that includes information regarding a particular print data set among the plurality of print data sets and information regarding a particular image forming apparatus among the plurality of image forming apparatuses to which the particular print data set is allocated; and an output unit configured to output, for each of the plurality of image forming apparatuses, the particular print data set and the print data for the separator to the particular image forming apparatus.

10 Claims, 9 Drawing Sheets

(56) References Cited

U.S. PATENT DOCUMENTS

| | | | |
|---|---|---|---|
| 9,832,339 | B1 | 11/2017 | Yee et al. |
| 2001/0048833 | A1 | 12/2001 | Katsuda et al. |
| 2002/0163666 | A1* | 11/2002 | Iwata .................. G06F 3/1207 358/1.15 |
| 2004/0042042 | A1 | 3/2004 | Utsunomiya |
| 2007/0121144 | A1 | 5/2007 | Kato |
| 2008/0278742 | A1 | 11/2008 | Poirier |
| 2008/0309973 | A1 | 12/2008 | Okamoto |
| 2008/0309979 | A1* | 12/2008 | Honda ................. G06F 3/1207 358/1.17 |
| 2009/0310175 | A1* | 12/2009 | Yoshizumi ........... G06F 3/1226 358/1.15 |
| 2010/0141985 | A1* | 6/2010 | Noy ..................... G06F 3/1204 358/1.15 |
| 2010/0302585 | A1 | 12/2010 | Saito |
| 2012/0188573 | A1 | 7/2012 | Jessen et al. |
| 2016/0210091 | A1 | 7/2016 | Martin et al. |

FOREIGN PATENT DOCUMENTS

| | | |
|---|---|---|
| EP | 0729078 A2 | 8/1996 |
| JP | H08-20172 A | 1/1996 |
| JP | 2002-032206 A | 1/2002 |
| JP | 2003-080806 A | 3/2003 |
| JP | 2006-031439 A | 2/2006 |
| JP | 2006-268317 A | 10/2006 |
| JP | 2006-277474 A | 10/2006 |
| JP | 2007-310770 A | 11/2007 |
| JP | 2013-208837 A | 10/2013 |
| JP | 2016-162302 A | 9/2016 |
| JP | 6-155834 B2 | 7/2017 |
| JP | 2018-025961 A | 2/2018 |
| KR | 10-2001-0050113 A | 6/2001 |

OTHER PUBLICATIONS

CS&E—Upload peer contribution by KIPO on May 17, 2019 in PCT/JP2019/007619 filed on Feb. 27, 2019.
International Search Report dated Jun. 4, 2019 in PCT/JP2019/007619 filed on Feb. 27, 2019.
CS&E—Upload peer contribution by USPTO on Apr. 25, 2019 in PCT/JP2019/007619 filed on Feb. 27, 2019.
CS&E—Upload peer contribution by CNIPA on May 5, 2019 in PCT/JP2019/007619 filed on Feb. 27, 2019.
CS&E—Upload peer contribution by EPO on May 10, 2019 in PCT/JP2019/007619 filed on Feb. 27, 2019.
European Search Report dated Nov. 10, 2021 corresponding to European patent application No. 19765052.6.

* cited by examiner

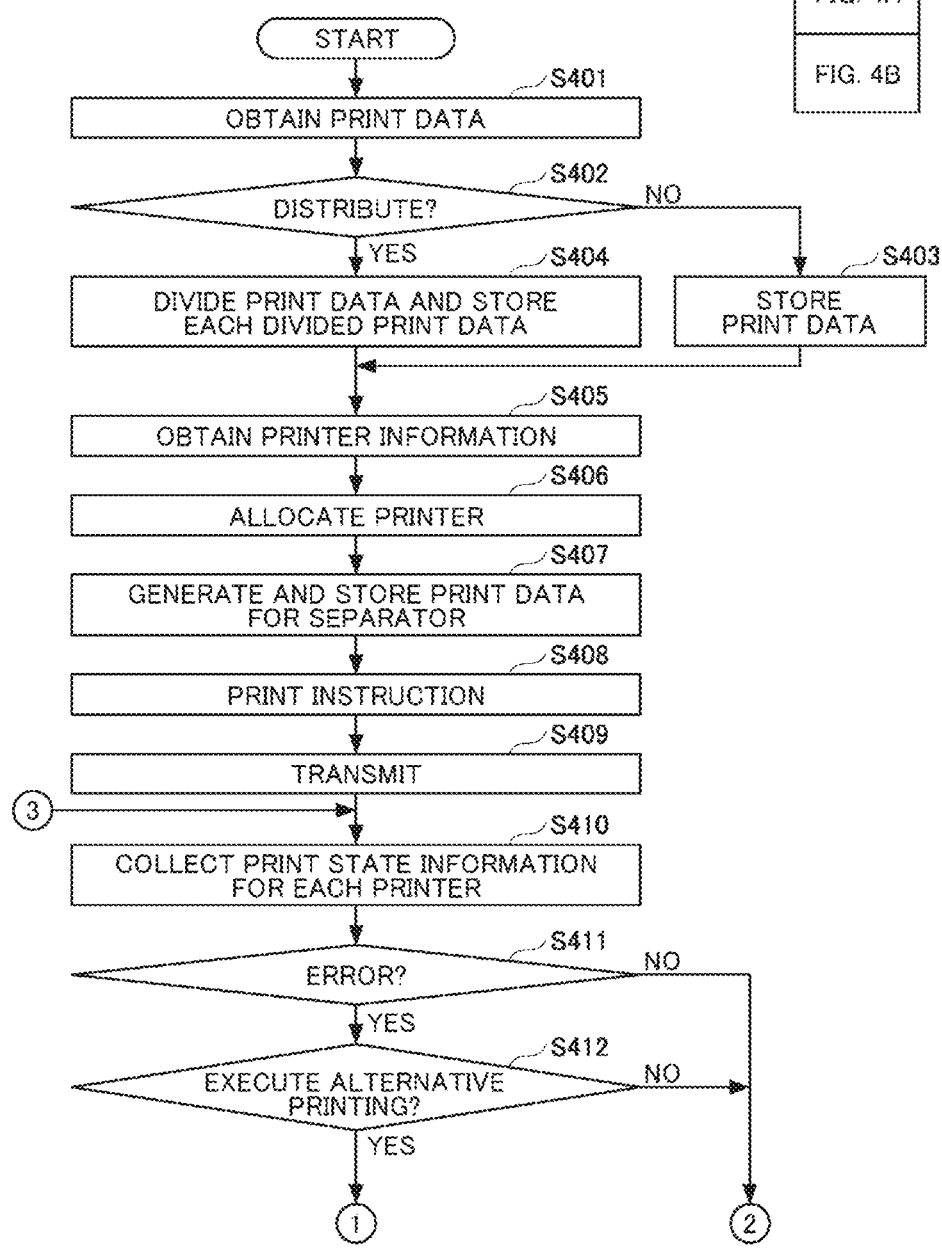

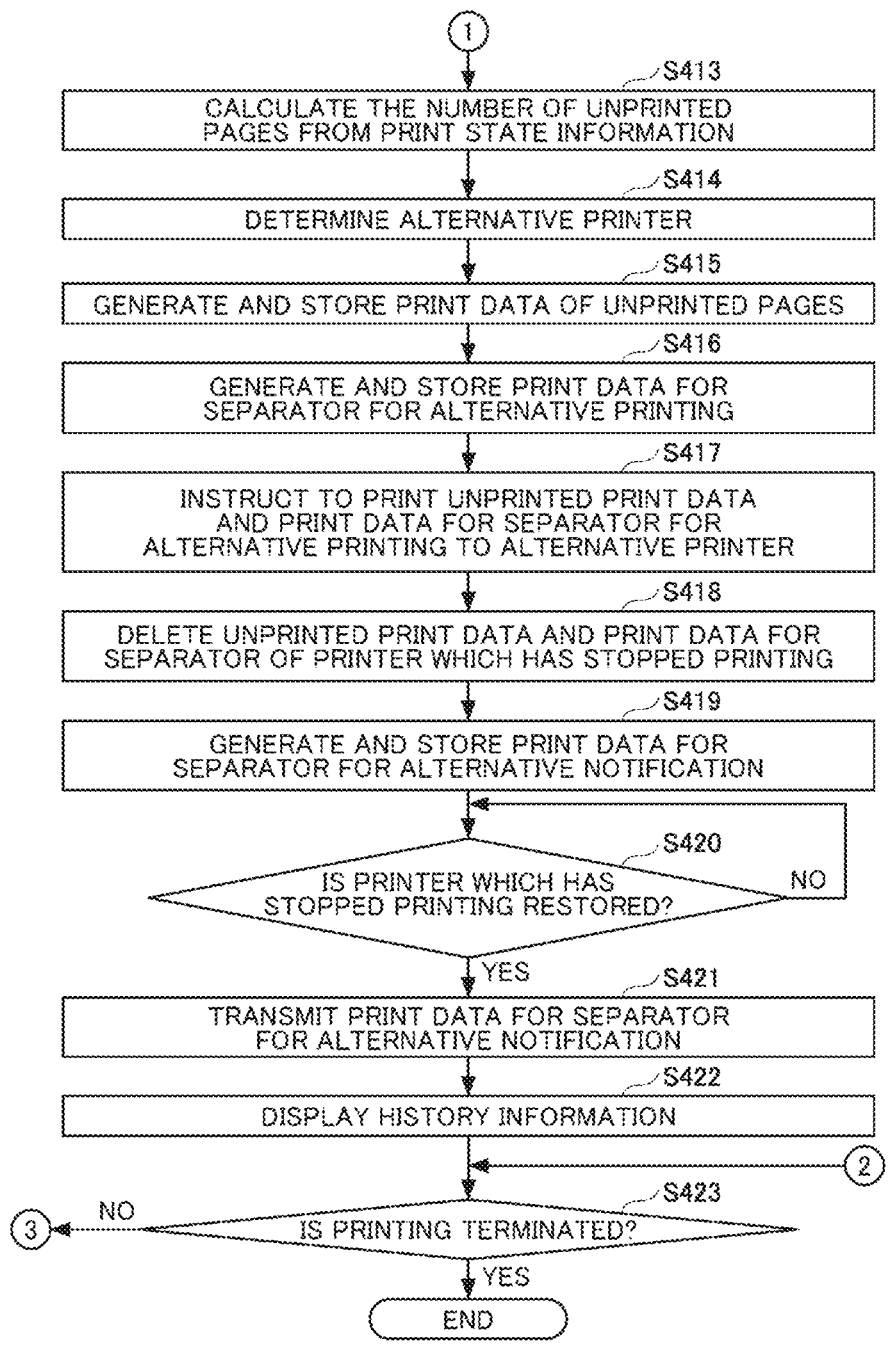

INFORMATION PROCESSING APPARATUS, INFORMATION PROCESSING SYSTEM, INFORMATION PROCESSING METHOD, AND STORAGE MEDIUM

This application is a national phase under 35 U.S.C. § 371 of PCT International Application No. PCT/JP2019/007619 which has an International filing date of Feb. 27, 2019, which claims priority to Japanese application No. 2018-039121, filed Mar. 5, 2018, the entire contents of each of which are hereby incorporated by reference.

TECHNICAL FIELD

The present invention relates to an information processing apparatus, an information processing system, an information processing method, and a storage medium.

BACKGROUND ART

A technique for performing printing using a plurality of printers is known. For example, a technique is known that automatically divides jobs or forms and causes the plurality of printers to perform printings based on the divided jobs or forms. Further, a technique is known that automatically make a second printer execute a job when an error or a failure is detected in a first printer.

Furthermore, a technique is known according to which a printer including plural stacks outputs a separator on which a sequence number, a date, a time, a job name, or the like is printed according to switching of the stacks.

CITATION LIST

Patent Literature

PTL 1: Japanese Unexamined Patent Application Publication No. 1994-155834
PTL 2: Japanese Unexamined Patent Application Publication No. 2006-277474
PTL 3: Japanese Unexamined Patent Application Publication No. 2013-208837

SUMMARY OF INVENTION

Technical Problem

However, conventionally, in a case where printing is performed by using a plurality of printers, when one is going to collect printed matters, the one has to look at a management screen that displays information for managing the plurality of printers and confirm which printer has executed which job. As a result, it takes time to collect the printed matters.

Furthermore, a technique of outputting a separator when a plurality of stacks is switched is not applicable to printing using the plurality of printers.

The present disclosure is made in view of the above issues, and an object of the present disclosure is to facilitate collecting a printed matter when printing is performed by using a plurality of printers.

Solution to Problem

Example embodiments of the present invention include an information processing apparatus, which includes a print management unit configured to allocate a plurality of print data sets to a plurality of image forming apparatuses, respectively, the plurality of print data sets being obtained by dividing one print data set; a separator data generation unit configured to generate, for each of the plurality of image forming apparatuses, print data for a separator, the print data for the separator including management information that includes information regarding a particular print data set among the plurality of print data sets and information regarding a particular image forming apparatus among the plurality of image forming apparatuses to which the particular print data set is allocated; and an output unit configured to output, for each of the plurality of image forming apparatuses, the particular print data set and the print data for the separator to the particular image forming apparatus to which the particular print data set is allocated.

Advantageous Effects of Invention

Printed matters are collected easily when printing is performed by using a plurality of printers.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 4A and 4B (FIG. 4) are a flowchart illustrating an example of an operation of the information processing apparatus according to the first embodiment.

DESCRIPTION OF EMBODIMENTS

Figure 1:
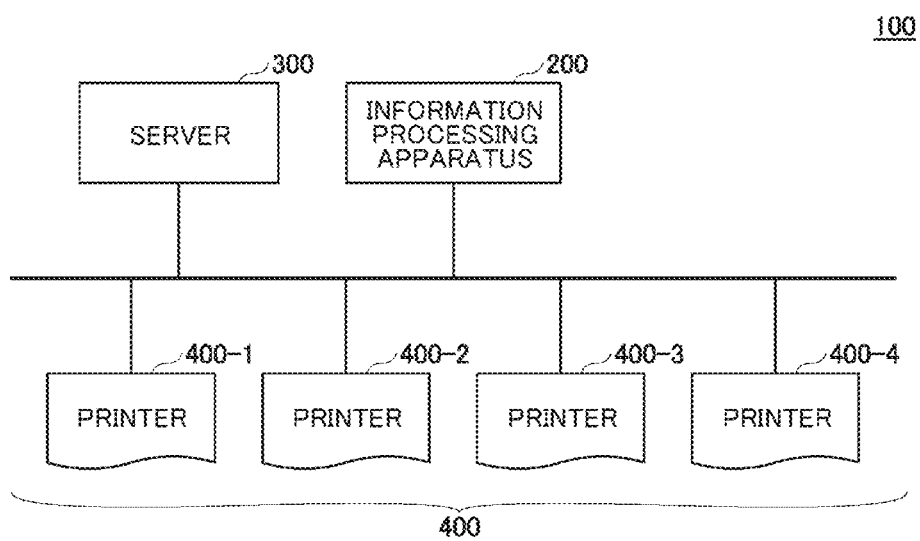
FIG. 1 is a diagram illustrating an example of a system configuration of an information processing system according to a first embodiment.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

A first embodiment will be described below with reference to the drawings. FIG. 1 is a diagram illustrating an example of a system configuration of an information processing system according to the first embodiment.

An information processing system 100 according to the present embodiment includes an information processing apparatus 200, a server 300, and printers (image forming apparatus) 400-1, 400-2, 400-3, and 400-4. Although in FIG. 1, the information processing system 100 according to the present embodiment includes four printers, the number of the printers is not limited to four. The information processing system 100 can include any suitable numbers of printers. In the following description, arbitrary one or ones of the printers 400-1, 400-2, 400-3, and 400-4 is/are referred to as a "printer(s) 400", unless they have to be distinguished.

In the information processing system 100 according to the present embodiment, the server 300 generates print data based on image data that is input to the server 300 and transmits the print data to the information processing apparatus 200.

The information processing apparatus 200 generates a print job by using the print data received from the server 300, assigns the printer 400 that is to execute the print job, and causes the assigned printer 400 execute the print job. The server 300 is, for example, a general-purpose computer.

The printer 400 according to the present embodiment is, for example, a general-purpose image forming apparatus. In another example, the printer 400 is a printing machine for performing commercial printing.

Furthermore, in the information processing system 100 according to the present embodiment, for example, in a case where distributed printing in which the print job is executed by the four printers 400-1 to 400-4 is performed, the information processing apparatus 200 causes each printer 400 to output a separator on which information indicating how to distribute print processing is printed.

The separator in the present embodiment refers to a paper sheet for partition to be inserted at the head of a printed matter, between the printed matters, or at the end of the printed matter.

In the present embodiment, by printing the information indicating how to distribute the print processing on the separator, one does not have to go to look at a management screen in order to confirm which job is printed by which printer 400 in a case of the distributed printing, and the printed matters can be easily collected. More specifically, according to the present embodiment, since a time is saved to confirm the printer 400 which has printed the printed matter to be collected next on the management screen, a time to collect the printed matters can be reduced. In the following description, the information indicating how to distribute the print processing is referred to as management information.

Figure 2:
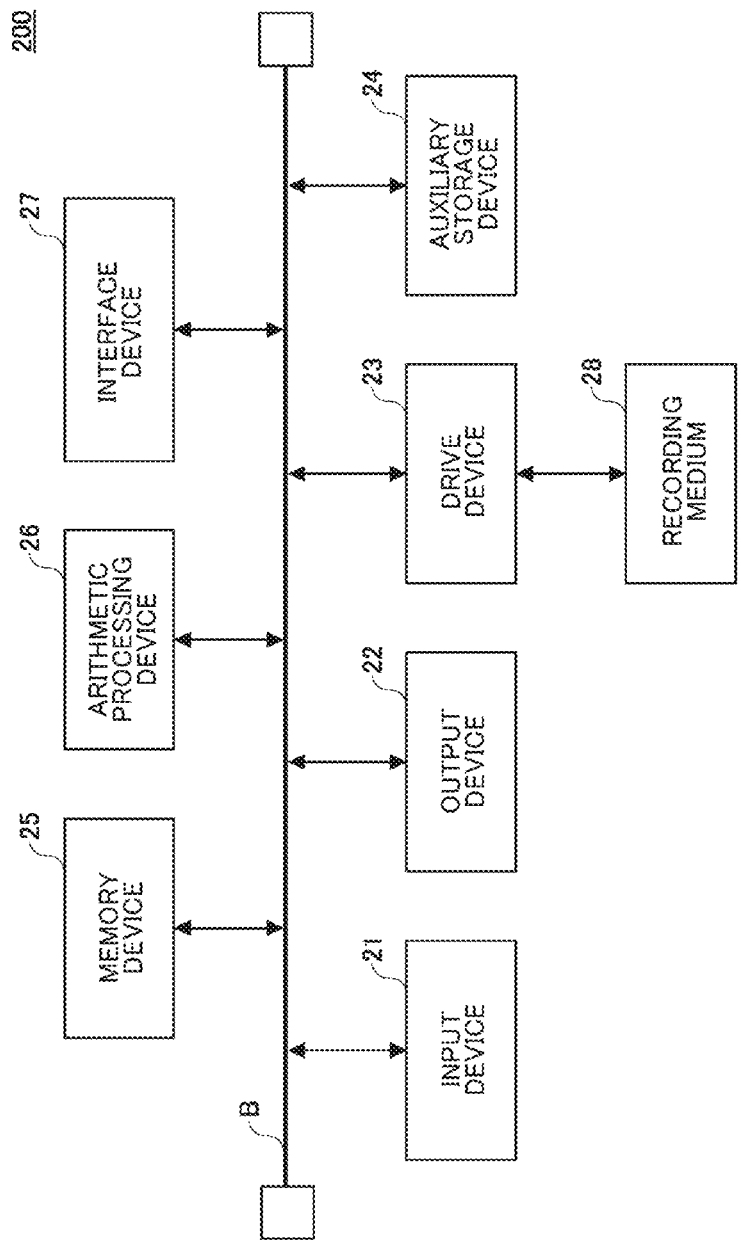
FIG. 2 is a block diagram illustrating an example of a hardware configuration of an information processing apparatus according to the first embodiment.

Hereinafter, the information processing apparatus 200 according to the present embodiment will be described. FIG. 2 is a block diagram illustrating an example of a hardware configuration of the information processing apparatus 200 according to the first embodiment.

The information processing apparatus 200 according to the present embodiment includes an input device 21, an output device 22, a drive device 23, an auxiliary storage device 24, a memory device 25, an arithmetic processing device 26, and an interface device 27, which are connected to each other via a bus B. The arithmetic processing device 26 is a central processing unit (CPU).

The input device 21 inputs various information and is implemented by, for example, a keyboard and a pointing device. The output device 22 outputs various information and is implemented by, for example, a display. The interface device 27 includes a local area network (LAN) card and the like and is used to connect to a network.

An information processing program according to the present embodiment is at least a part of various programs which control the information processing apparatus 200. The information processing program is provided, for example, through distribution of a recording medium 28 or download from the network. As the recording medium 28 which stores the information processing program, various types of storage media, for example, a storage medium which optically, electrically, or magnetically records information such as a compact disc read-only memory (CD-ROM), a flexible disk, and a magnetooptical disk and a semiconductor memory which electrically records information such as a ROM and a flash memory can be used.

Furthermore, when the recording medium 28 which stores the information processing program is set to the drive device 23, the information processing program is installed from the recording medium 28 to the auxiliary storage device 24 via the drive device 23. The information processing program downloaded from the network is installed to the auxiliary storage device 24 via the interface device 27.

The auxiliary storage device 24 stores the installed information processing program and stores necessary files, data, and the like such as databases. The memory device 25 reads and stores the information processing program from the auxiliary storage device 24 at the time when the information processing apparatus 200 is activated. Then, the arithmetic processing device 26 implements various processing described later according to the information processing program stored in the memory device 25.

Figure 3:
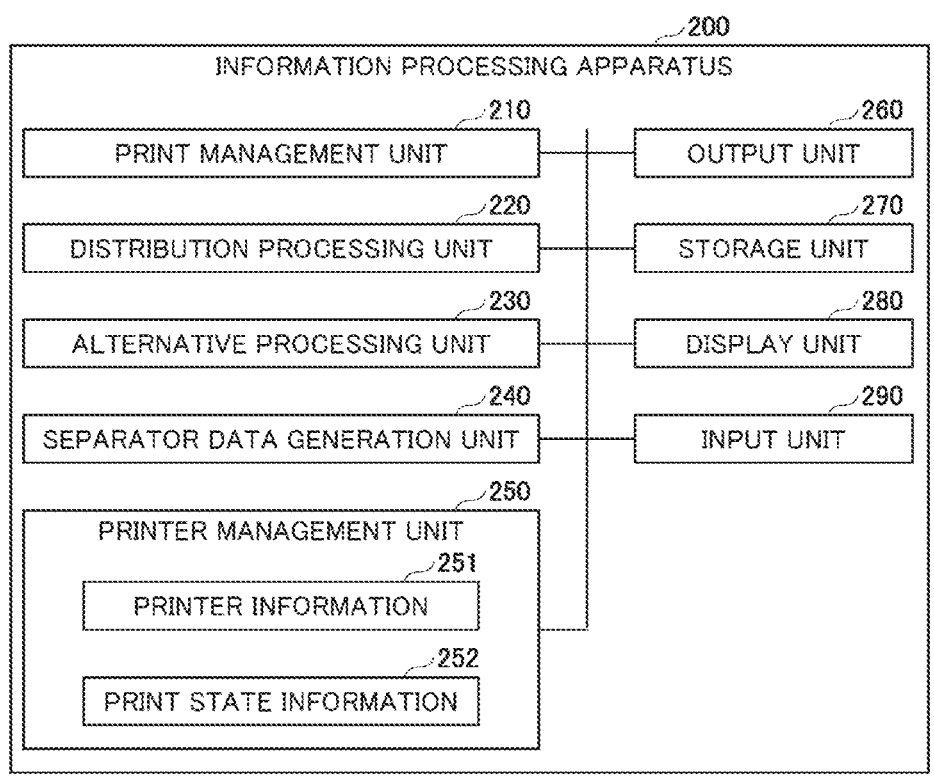
FIG. 3 is a block diagram illustrating an example of a functional configuration of the information processing apparatus according to the first embodiment.

FIG. 3 is a block diagram illustrating a functional configuration of the information processing apparatus 200 according to the first embodiment. The arithmetic processing device 26 of the information processing apparatus 200 executes the information processing program stored in a memory to implement each unit described with reference to FIG. 3.

The information processing apparatus 200 according to the present embodiment includes a print management unit 210, a distribution processing unit 220, an alternative processing unit 230, a separator data generation unit 240, a printer management unit 250, an output unit 260, a storage unit 270, a display unit 280, and an input unit 290.

The print management unit 210 according to the present embodiment receives the print data generated by the server 300, generates the print job for each printer 400, and causes each printer 400 to execute the print job.

More specifically, the print management unit 210 determines the number of pages to be distributed to each of the printers 400 and the printer 400 which executes printing based on printer information 251 held by the printer management unit 250 and various settings input by the input unit 290. Further, the print management unit 210 displays the determined number and printer on the display unit 280. In other words, the print management unit 210 determines how to distribute the print processing. Details of the printer information 251 is described later.

The print management unit 210 according to the present embodiment instructs the corresponding printer 400 to perform printing according to one of divided print data sets, which are obtained by dividing the print data, and print data for a separator generated by the separator data generation unit 240.

The distribution processing unit 220 divides the print data into a plurality of divided print data sets in response to an instruction from the print management unit 210 and stores the divided data sets in the storage unit 270.

The alternative processing unit 230 generates alternative print data corresponding to pages from the first unprinted page to the last unprinted page and stores the generated data in the storage unit 270. More specifically, the print management unit 210 obtains the number of printed pages referring to print state information 252 stored in the printer management unit 250, and subtracts the number of printed pages from a total number of pages of the divided print data. Details of the print state information 252 is described later.

The separator data generation unit 240 obtains information regarding the plurality of divided print data sets and information regarding the printer 400 which is to execute each of the plurality of divided print data sets from the print management unit 210. Further, the separator data generation unit 240 generates the print data for a separator for each of the plurality of divided print data sets and for each printer 400 and stores the generated data in the storage unit 270.

In the following description, information including the information regarding the plurality of divided print data sets and the information regarding the printer which is to execute each of the plurality of the divided print data sets is referred to as the management information. Therefore, the print data for a separator generated by the separator data generation unit 240 of the present embodiment includes the management information.

The separator data generation unit 240 according to the present embodiment generates print data for a separator for each of a front separator, which is printed before a first page of each of the plurality of the divided print data sets, and an end separator, which is printed after a last page of each of the plurality of the divided print data sets. The separator can be printed in a case where the print data is not divided.

The printer management unit 250 holds the printer information 251 and the print state information 252 for each printer 400.

The printer information 251 includes information for specifying the printer 400 and information indicating the state of the printer 400. The information for specifying the printer 400 is, for example, a name of the printer 400. The information indicating the state of the printer 400 includes information indicating whether or not the printer 400 is executing the print job, whether or not the printer 400 is on standby, or whether or not an error occurs in the printer 400. Furthermore, the information indicating the state of the printer 400 can include a print start time and a print end time of the printer 400.

The print state information 252 includes at least information indicating the number of printed pages after printing is started. Furthermore, the print state information 252 can include, for example, information indicating a name of the print job in progress, the total number of print data, a page number of a first page of the divided print data, a page number of a last page of the divided print data, and the total number of pages of the divided print data, and the like.

The printer management unit 250 according to the present embodiment can send a notification to the print management unit 210 each time when the print state information 252 is updated.

In response to receiving the information for specifying the printer 400 from the print management unit 210, the output unit 260 transmits the print data stored in the storage unit 270, in order of the print data for the front separator, the divided print data, and the print data for the end separator, to the specified printer 400.

The storage unit 270 is, for example, a storage area, which is implemented by the auxiliary storage device 24 and the memory device 25 of the information processing apparatus 200.

The display unit 280 is, for example, a display that the information processing apparatus 200 includes. In another example, the display unit 280 is a display device connected to the information processing apparatus 200. The input unit 290 receives various information and operations input to the information processing apparatus 200.

Next, an operation of the information processing apparatus 200 according to the present embodiment is described with reference to FIG. 4. FIG. 4 is a flowchart illustrating an operation by the information processing apparatus 200 according to the first embodiment.

The print management unit 210 of the information processing apparatus 200 according to the present embodiment obtains the print data from the server 300 (step S401). Subsequently, the print management unit 210 determines whether or not to print the obtained print data by distributed printing using the plurality of printers 400 (step S402). Specifically, the print management unit 210 can make the above determination according to whether or not the distributed printing is set in advance. Furthermore, even in a case where the distributed printing is not set, the print management unit 210 can determine that the distributed printing is to be executed, for example, according to the number of pages of the print data, the number of printers 400 that are on standby, and the like.

In a case where the print management unit 210 determines in step S402 that the distributed printing is not to be executed, the print management unit 210 stores the obtained print data in the storage unit 270 (step S403), and the operation proceeds to step S405 described later.

In a case where the print management unit determines in step S402 that the distributed printing is to be executed, the distribution processing unit 220 of the information processing apparatus 200 divides the print data into a plurality of divided print data sets and stores the plurality of divided print data sets individually in the storage unit 270 (step S404).

How to divide the print data is set in advance, for example. In this case, the distribution processing unit 220 generates the plurality of divided print data sets by dividing the print data into the set number or the set number of pages.

In another example, how to divide the print data can be determined by the print management unit 210. In this case, it is preferable that the print management unit 210 obtain the number of printers 400 that are on standby by referring to the printer information 251 held by the printer management unit 250 and divide the print data into the plurality of divided print data sets whose number is equal to the obtained number of printers being on standby.

Subsequently, the print management unit 210 of the information processing apparatus 200 obtains the printer information 251 from the printer management unit 250 (step S405).

Subsequently, the print management unit 210 allocates the print data or the plurality of divided print data sets stored in the storage unit 270 to the printer 400 or the printers 400 based on the printer information 251 (step S406). In other words, the print management unit 210 determines, for each of the plurality of divided print data sets, the printer 400 which is to perform printing.

Subsequently, the separator data generation unit 240 of the information processing apparatus 200 generates the print data for a separator and stores the generated data for a separator in the storage unit 270 (step S407).

More specifically, at S407, in a case where the plurality of the divided print data sets are stored in the storage unit 270, the separator data generation unit 240 generates the print data for a separator including the management information for each of the plurality of divided print data sets and stores the print data for a separator in association with each of the plurality of divided print data sets in the storage unit 270.

The management information according to the present embodiment includes, for example, the total number of pages of the print data, the number of pages and division units of the plurality of divided print data sets, an ordinal number of the divided print data among the plurality of divided print data sets, the total number of division, a page number of start page of the divided print data, a page number of end page of the divided print data, as the information regarding the divided print data.

In addition, the management information according to the present embodiment includes a print job name, the number of printers 400 to be used, the name of the printer, and the like as the information regarding the printer which is to print the divided print data.

For example, the management information is set in advance. In another example, the print management unit 210 determines the management information. In other words, the management information can be input to the information processing apparatus 200 in advance or can be generated by the print management unit 210.

In one example, the separator data generation unit 240 generates only print data for the front separator that is printed before the first page of the divided print data. In another example, the separator data generation unit 240 generates and store the print data for the front separator and the print data for the end separator that is printed after the last page of the divided print data.

Subsequently, when the print data for a separator is generated, the print management unit 210 sends a print instruction (an output instruction) to the output unit 260 (step S408). In response to receiving the print instruction, the output unit 260 transmits each of the plurality of divided print data sets and the print data for a separator associated with each of the plurality of divided print data sets, which are stored in the storage unit 270, to the printer 400 to which each of the plurality of divided print data sets is allocated (step S409). Then, the printers 400 start printing.

Next, the printer management unit 250 of the information processing apparatus 200 collects the print state information 252 for each of the printers 400 (step S410).

Subsequently, the information processing apparatus 200 determines whether or not an error notification is received from any one of the printers 400 (step S411). In a case where no error notification is received in step S411, the operation proceeds step S423 described later.

In a case where the information processing apparatus 200 determines that the error notification is received in step S411, the alternative processing unit 230 determines whether or not to execute alternative printing (step S412).

For example, the alternative processing unit 230 sends an inquiry to the print management unit 210 as to whether setting regarding the alternative printing has been configured, to determine whether to execute the alternative printing. In another example, the alternative processing unit 230 sends an inquiry to print management unit 210 as to whether the alternative printing can be executed, to determine whether to execute the alternative printing.

To the print management unit 210 according to the present embodiment, information indicating whether to execute the alternative printing can be set for each kind of error. Furthermore, to the print management unit 210, for example, setting to execute the alternative printing after a predetermined time has been passed from the reception of the error notification can be configured.

When the alternative processing unit 230 determines in step S412 that the alternative printing is not to be executed, the operation proceeds to step S423 described later.

When the alternative processing unit 230 determines in step S412 that the alternative printing is to be executed the print management unit 210 of the information processing apparatus 200 refers to the print state information 252 of the printer 400 that has transmitted the error notification and calculates the number of unprinted pages which are not printed yet by the printer 400 (step S413).

Subsequently, the print management unit 210 refers to the printer information 251 and determines the printer 400 which is to execute the alternative printing for the unprinted pages (step S414). At this time, the print management unit 210 can display a message indicating that the alternative printing is going to be executed, the number of unprinted pages, a name of the printer 400 which is to execute the alternative printing, and the like on the display unit 280. Furthermore, in the following description, the printer 400 which executes the alternative printing is referred to as an "alternative printer 400".

Subsequently, the alternative processing unit 230 of the information processing apparatus 200 generates the print data corresponding to the number of unprinted pages calculated by the print management unit 210 and stores the generated print data in the storage unit 270 (step S415).

Subsequently, the separator data generation unit 240 generates the print data for a separator for the alternative printing and stores the print data for a separator in the storage unit 270 (step S416). The print data for a separator for the alternative printing includes alternative information indicating the number of pages to be printed by the alternative printing, the name of the printer 400 in which an error occurs, and the like.

Subsequently, the alternative processing unit 230 of the information processing apparatus 200 instructs the alternative printer 400 perform printing according to the print data corresponding to the unprinted pages and the print data for a separator for the alternative printing (step S417).

Subsequently, the print management unit 210 of the information processing apparatus 200 causes the printer 400 that has aborted printing to delete the print data corresponding to unprinted pages and the print data for a separator (step S418).

Subsequently, the separator data generation unit 240 generates print data for a separator for alternative notification including alternative notification information indicating that another printer 400 has executed the alternative printing instead of the printer 400 that has aborted printing and stores the generated print data for a separator in the storage unit 270 (step S419). The print data for a separator for the alternative notification is output by the printer 400 when the printer 400 which has aborted printing is restored.

Subsequently, the printer management unit 250 of the information processing apparatus 200 determines whether or not the printer 400 which has aborted printing has been restored (step S420). In a case where the printer management unit 250 determines in step S420 that the printer 400 has not restored yet, the printer management unit 250 waits until the printer 400 is restored.

In a case where the printer management unit 250 determines in step S420 that the printer 400 which has aborted printing has been restored, the print management unit 210 causes the output unit 260 to transmit the print data for a separator for the alternative notification to the restored printer 400 (step S421).

Subsequently, the print management unit 210 causes the display unit 280 to display contents of the error and information indicating that the alternative printing has been executed as a printing history (step S422).

Subsequently, the information processing apparatus 200 determines whether or not printing is terminated (step S423). In a case where the information processing apparatus 200 determines in step S423 that printing is not terminated, the operation returns to step S410. In a case where the information processing apparatus 200 determines in step S423 that printing is terminated, the operation ends.

As described heretofore, in the present embodiment, by printing the management information indicating how to distribute on the separator that is output when the distributed printing is performed, printed matters can be easily collected when the distributed printing is executed by using the plurality of printers 400.

Figure 5:
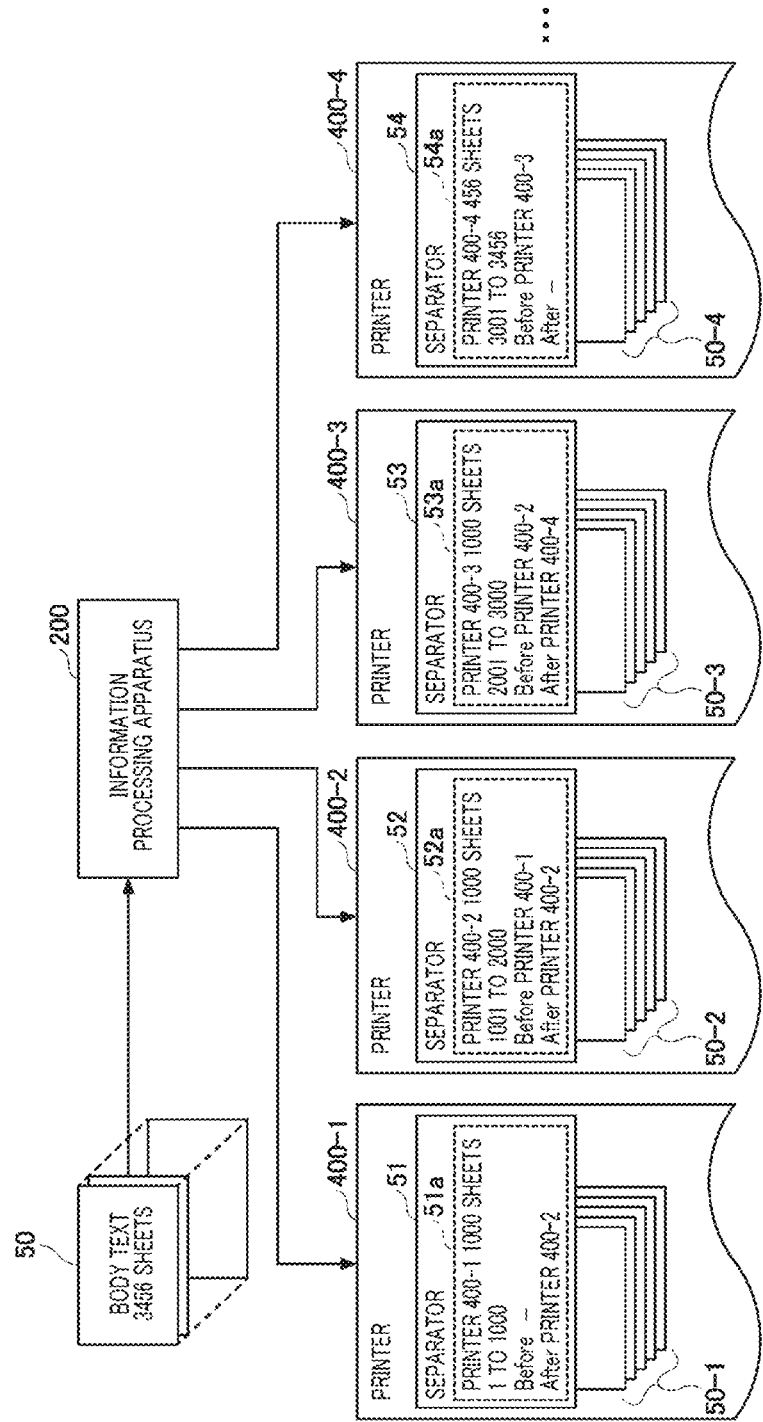
FIG. 5 is a first diagram illustrating an example of separators according to the first embodiment.

Example of the separator on which the management information is printed are described below. FIG. 5 is a diagram of an example of the separators according to the first embodiment.

In FIG. 5, an example case is illustrated where the information processing apparatus 200 divides print data 50 into four divided print data sets and allocates the four divided print data sets to the printers 400-1 to 400-4, respectively.

In the example in FIG. 5, one of the divided print data sets corresponding to a printed matter 50-1 is allocated to the printer 400-1, another one of the divided print data sets corresponding to a printed matter 50-2 is allocated to the printer 400-2, still another one of the divided print data sets corresponding to a printed matter 50-3 is allocated to the printer 400-3, and still another one of the divided print data sets corresponding to a printed matter 50-4 is allocated to the printer 400-4.

Furthermore, the printer 400-1 outputs a separator 51 before a first page of the printed matter 50-1. The printer 400-2 outputs a separator 52 before a first page of the printed matter 50-2. The printer 400-3 outputs a separator 53 before a first page of the printed matter 50-3. The printer 400-4 outputs a separator 54 before a first page of the printed matter 50-4.

Management information 51a is printed on the separator 51, management information 52a is printed on the separator 52, management information 53a is printed on the separator 53, and management information 54a is printed on the separator 54.

As information items, each management information includes the total number of printed matters output from each printer 400, a page number of a start page and a page number of a last page of the printed matter, a name of the printer which outputs a printed matter prior to the printed matter printed by each printer 400, a name of the printer which outputs a printed matter subsequent to the printed matter printed by each printer 400.

Specifically, the management information 51a includes "1000 sheets" indicating the total number of printed matter 50-1, "1-1000" indicating the page number of the start page and the page number of the last page of the printed matter 50-1, and the name of the printer 400 "printer 400-2" which prints the page subsequent to the 1000th page. Since the printer 400-1 is the first printer 400 that performs prints according to the print data, the management information 51a does not include the name of the printer which prints the page before the first page.

The management information 52a includes "1000 sheets" indicating the total number of the printed matter 50-2, "1001 to 2000" indicating the page number of the start page and the page number of the last page of the printed matter 50-2, the name of the printer 400 "printer 400-1" which prints pages before the 1001th page, and the name of the printer 400 "printer 400-3" which prints pages subsequent to the 2000th page. The management information 53a includes substantially the same information as that of the management information 52a.

The management information 54a includes "456 sheets" indicating the total number of the printed matter 50-4, "3001 to 3456" indicating the page number of the start page and the page number of the last page of the printed matter 50-4, and "printer 400-3" indicating the name of the printer 400 which has printed the page before the 3001th page. Since the printer 400-4 is the last printer 400 that performs printing according to the print data, the management information 54a does not include the name of the printer which prints the page subsequent to the 3456th page.

In the present embodiment, by printing the information indicating how to distribute the print data on the separator, for example, when a person collects the printed matter 50-1, the person can recognize the number of pages, the start page, and the end page of the printed matter 50-1 as well as that the printed matter 50-2 subsequent to the printed matter 50-1 is printed by the printer 400-2. Therefore, according to the present embodiment, the printed matter can be easily collected, and a time to collect the printed matter can be reduced.

Furthermore, in the present embodiment, the printed matter and the separator are output in different directions. Specifically, in a case where a paper sheet (printed matter) on which the print data has been printed is output in the vertical direction, a paper sheet of a separator is output in a lateral direction, for example.

In this way, by making the direction in which the printed matter is output be different from the direction in which the separator is output, the separator and the printed matter can be easily distinguished.

Figure 6:
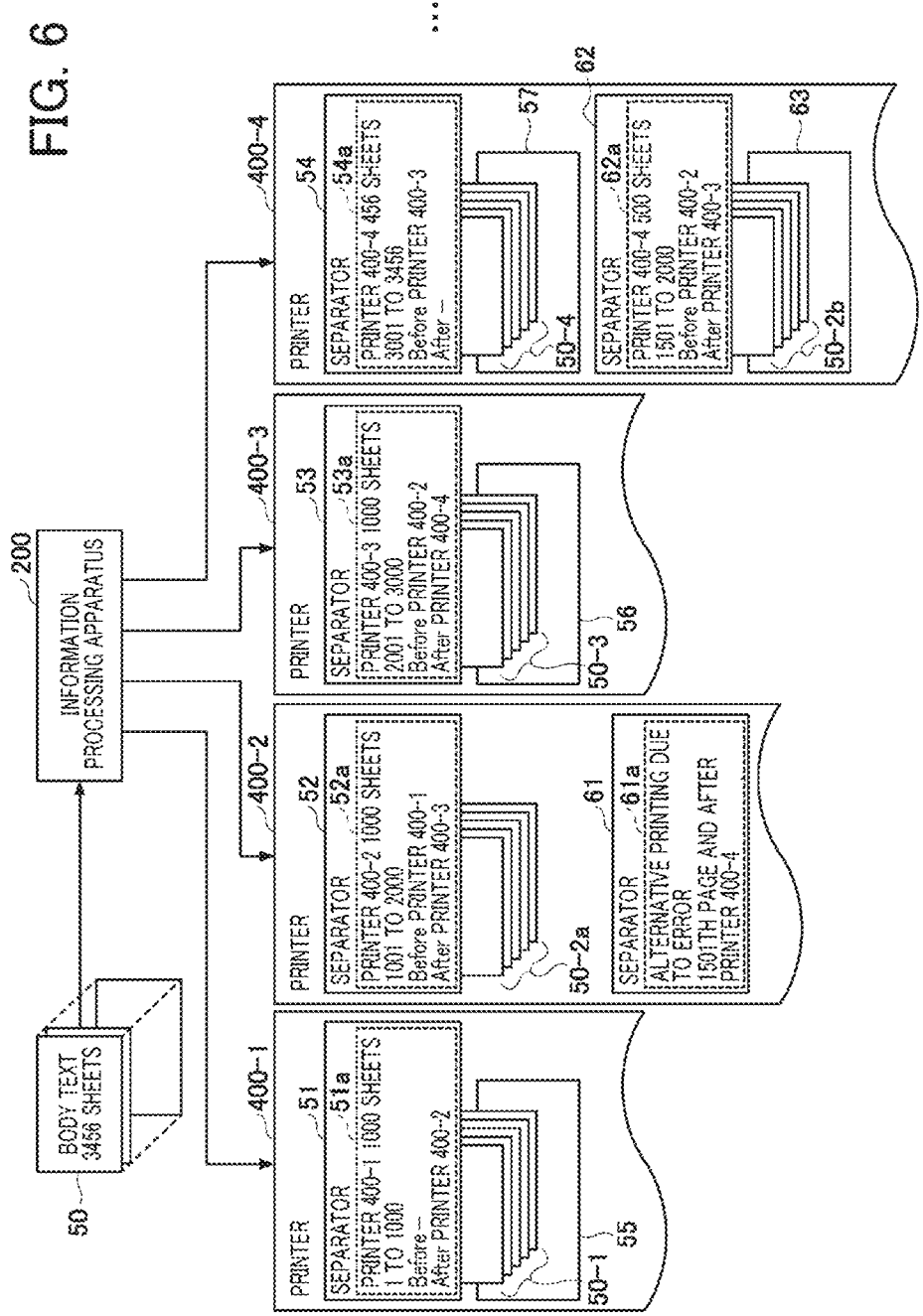
FIG. 6 is a second diagram illustrating an example of the separators according to the first embodiment.

FIG. 6 is a diagram illustrating another example of separators according to the first embodiment. In the example in FIG. 6, a case is illustrated in which the information processing apparatus 200 divides the print data 50 into four divided print data sets and allocates the four divided print data sets to the printers 400-1 to 400-4, respectively, printing by the printer 400-2 is interrupted, and alternative printing is executed by the printer 400-4. Furthermore, in the example in FIG. 6, a case is illustrated where the front separator and the end separator are output.

In the example of FIG. 6, the printer 400-1 outputs the separator 51 as a front separator of the printed matter 50-1 and a separator 55 as an end. The management information 51a is printed on the separator 51.

In the example in FIG. 6, in the printer 400-2 outputs a printed matter 50-2a which is output before printing is interrupted due to an error and the separator 52 as a front separator of the printed matter 50-2a. The management information 52a is printed on the separator 52.

In the example in FIG. 6, after the printer 400-2 is restored, a separator 61 for alternative notification is output.

Alternative notification information 61a indicating that another printer 400 has executed the alternative printing is printed on the separator 61.

The alternative notification information 61a includes a notification "Alternative printing due to error" indicating that the alternative printing is executed due to occurrence of the error and a notification "Printer 400-4, the page 1501 and subsequent pages" indicating that the printer 400-2 has completed printing of up to the 1500th page and the printer 400-4 has executed the alternative printing of the 1501 page and subsequent pages.

Furthermore, the printer 400-3 outputs the separator 53 as a front separator of the printed matter 50-3 and a separator 56 as an end separator. The management information 53a is printed on the separator 53.

The printer 400-4 outputs the separator 54 as a front separator of the printed matter 50-4 and a separator 57 as an end separator. The management information 54a is printed on the separator 54.

In addition, the printer 400-4 outputs a printed matter 50-2b as alternative printing for the printer 400-2.

The printer 400-4 outputs a front separator 62 for alternative printing before the first page of the printed matter 50-2b and an end separator 63 for alternative printing after the last page of the printed matter 50-2. Alternative information 62a is printed on the front separator 62. The alternative information 62a includes "500 sheets" indicating the total number of the printed matter 50-2b, "1501 to 2000" indicating the page number of the start page and the page number of the last page of the printed matter 50-2b, the "printer 400-2" indicating the name of the printer 400 that has printed the pages before the 1501th page, and the "printer 400-3" indicating the name of the printer 400 that prints the page subsequent to the 2000th page. The alternative information 62a can include information indicating that the printed matter 50-2 is output by the alternative printing.

As described heretofore, in the present embodiment, in a case where the alternative printing is executed, the printer 400 that aborts printing outputs the separator 61 for alternative printing on which a notification indicating that another printer 400 executes alternative printing is printed. In addition, the printer 400 that executes the alternative printing instead of the printer 400 that aborts printing outputs a separator for alternative printing on which alternative information regarding alternative printing is printed.

Therefore, according to the present embodiment, even in a case where printing is interrupted due to an error and the like and alternative printing is executed, a person who collects the printed matter can recognize a printer 400 from which a printed matter is to be collected next.

Furthermore, in the example in FIG. 6, in the present embodiment, the front separator and the end separator are output in a direction different from the direction of the printed matter. Therefore, for example, even when a print matter based on another print data is output after the end separator, the printed matter to be collected can be easily collected.

In the present embodiment, items in the management information and the alternative information printed on the separator are not limited to the examples described above with reference to FIGS. 5 and 6. Provided that at least the information for specifying the printer 400 that outputs a subsequent printed matter is printed on the separator, other items included in the management information and the alternative information can be omitted.

In the present embodiment, an administrator of the information processing system 100 and the like can set items to printed on the separator among the information items included in the management information and the alternative information.

Furthermore, on the separator, information indicating a printing progress state of the other printer 400 and information indicating the state of each printer 400, a remaining amount of paper sheets of the printer 400, a time zone when paper sheets are to be supplied, and the like may be printed. By printing such information on the separator, when one collects the printed matter, the one can recognize the remaining amount and the supply timing of the paper sheets.

Furthermore, in the present embodiment, a size of the separator can be different from that of a paper sheet on which the print data is printed. Specifically, in the present embodiment, the size of the paper sheet output as a separator can be larger than the size of the paper sheet on which the print data is printed. Furthermore, in the present embodiment, a color of the paper sheet output as a separator can be different from a color of the paper sheet on which the print data is printed.

In addition, in the present embodiment, printing positions of the management information, the alternative information, and the alternative notification information on the separator can be a margin of the printed matter. Furthermore, in the present embodiment, assuming that a surface of the printed matter on which the print data is printed is a front surface, in the separator, various information may be printed on the rear surface. This makes it easier to distinguish the separator from the printed matter.

Furthermore, in the present embodiment, for example, the management information, the alternative information, and the alternative notification information can be printed on the separator as a two-dimensional code. In this case, a person who collects the printed matter can refer to the management information by reading the two-dimensional code printed on the separator by a terminal having a function for reading the two-dimensional code such as a smartphone.

Second Embodiment

A second embodiment is described below with reference to the drawings. The second embodiment is different from the first embodiment in that the management information is expressed as an image. Therefore, in the following description of the second embodiment, only differences from the first embodiment will be described. The same reference numerals are given to the same or corresponding functions or configurations as those of the first embodiment, and redundant descriptions thereof are omitted or simplified appropriately.

Figure 7:
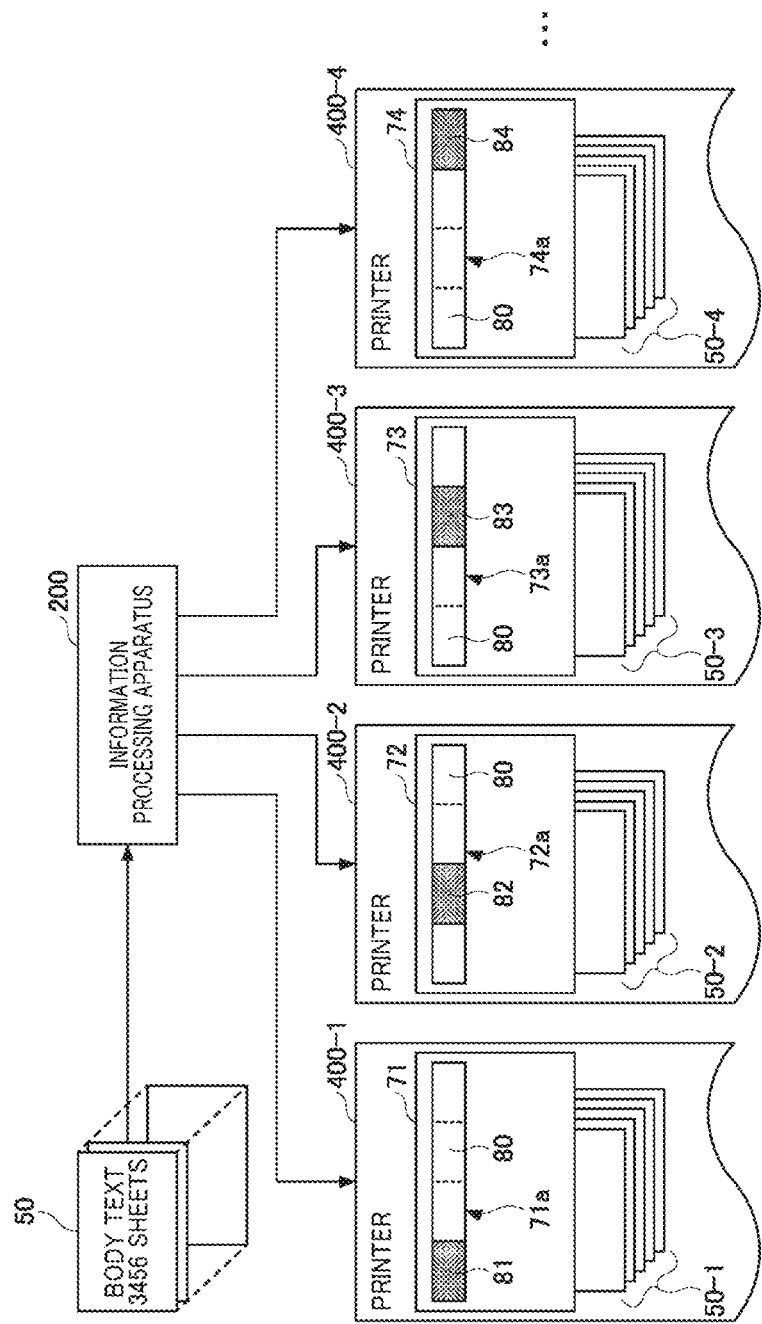
FIG. 7 is a first diagram illustrating an example of separators according to a second embodiment.

FIG. 7 is a diagram illustrating an example of separators according to the second embodiment. In FIG. 7, a case is illustrated where an information processing apparatus 200 divides print data 50 into four divided print data sets and allocates the four divided print data sets to the printers 400-1 to 400-4, respectively.

Furthermore, in the example in FIG. 7, the printer 400-1 outputs a separator 71 before a first page of a printed matter 50-1. The printer 400-2 outputs a separator 72 before a first page of a printed matter 50-2. The printer 400-3 outputs a separator 73 before a first page of a printed matter 50-3. The printer 400-4 outputs a separator 74 before a first page of a printed matter 50-4.

An image 71a as management information is printed on the separator 71, an image 72a as the management information is printed on the separator 72, an image 73a as the management information is printed on the separator 73, and an image 74a as the management information is printed on the separator 74.

The image 71a includes an image 80 of a bar corresponding to the total number of pages of a printed matter to be printed according to print data obtained from a server 300 and a marker image 81 indicating a position corresponding to the number of pages of a printed matter output from the printer 400.

In the image 71a, a portion from the beginning to about ¼ of the image 80 of the bar is emphasized by the marker image 81. Therefore, the image 71a indicates that the number of pages of the printer 400-1 output from the printer 400-1 is ¼ of the number of pages of the entire printed matter printed according to the print data and a printed matter from the first page to the page at ¼ of the number of entire printed matter is output from the printer 400-1.

In the image 72a, a portion from ¼ to about ½ of the image 80 of the bar is emphasized by a marker image 82. Therefore, the image 72a indicates that the printed matter from the next page of the page at ¼ of the number of entire printed matter to the page at ½ is output from the printer 400-2.

The same applies to a marker image 83 of the image 73a and a marker image 84 of the image 74a. In other words, the image 73a indicates that the printed matter from a page next to a page at the ½ of the number the pages of the entire matter to a page at ¾ is output from the printer 400-3. Furthermore, the image 74a indicates that the printed matter from a page next to a page at ¾ of the number of pages of the entire printed matter to the final page is output from the printer 400-4.

In the present embodiment, by printing the management information on the separator as the image as illustrated in FIG. 7, it is possible to visually recognize the printer 400 which outputs the printed matter of the next page, and it is not necessary to read characters printed on the separator.

Figure 8:
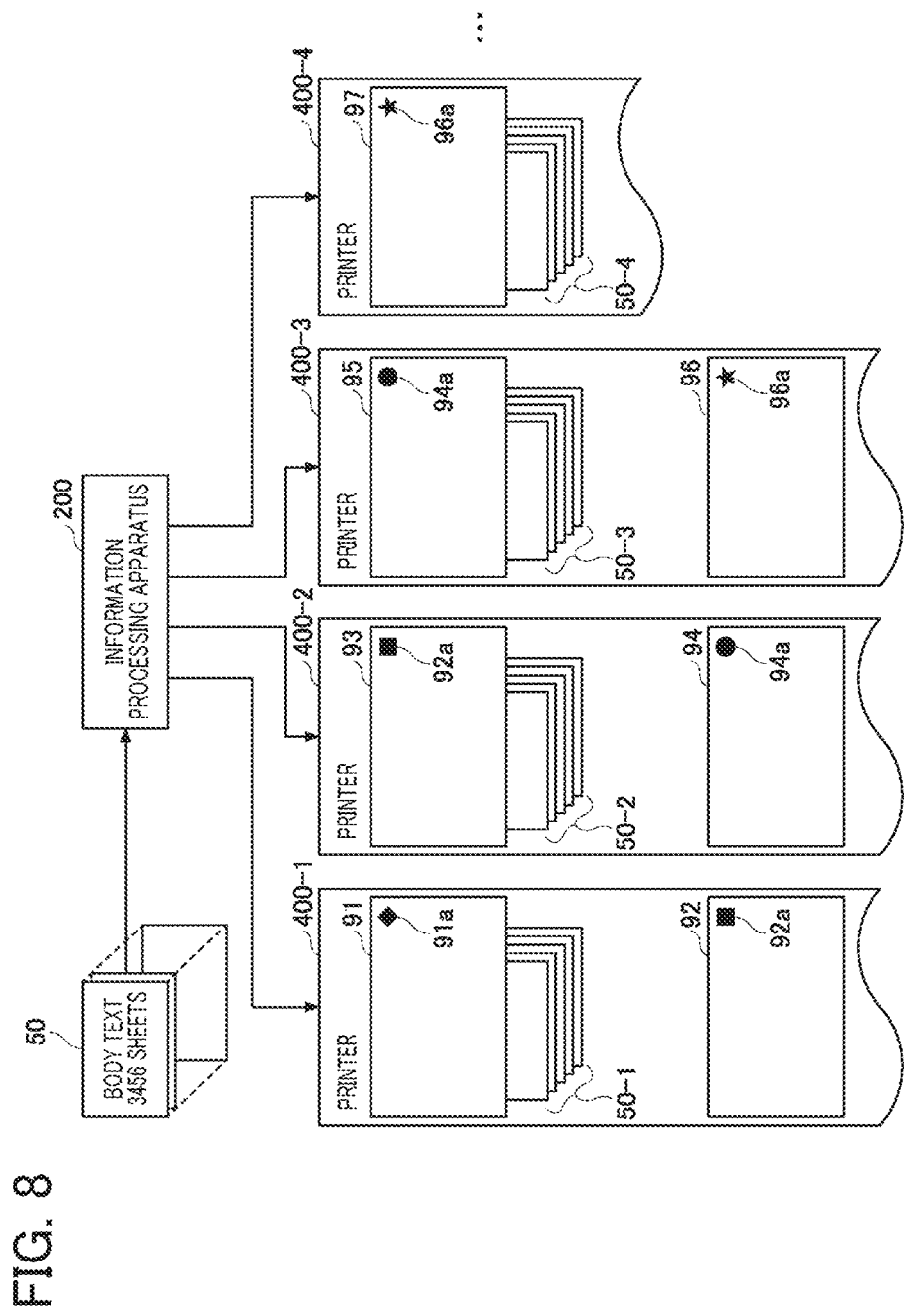
FIG. 8 is a second diagram illustrating an example of the separators according to the second embodiment.

FIG. 8 is a diagram illustrating another example of the separators according to the second embodiment. In the example in FIG. 8, the printer 400-1 outputs a front separator 91 and an end separator 92 of the printed matter 50-1. The printer 400-2 outputs a front separator 93 and an end separator 94 of the printed matter 50-2. Furthermore, the printer 400-3 outputs a front separator 95 and an end separator 96 of the printed matter 50-3. The printer 400-4 outputs a front separator 97 of the printed matter 50-4.

A mark 91a is printed on the front separator 91 of the printed matter 50-1, and a mark 92a is printed on the end separator 92. Furthermore, the mark 92a is printed on the front separator 93 of the printed matter 50-2, and a mark 94a is printed on the end separator 94. In addition, the mark 94a is printed on the front separator 95 of the printed matter 50-3, and a mark 96a is printed on the end separator 96. Further, the mark 96a is printed on the front separator 97 of the printed matter 50-4.

That is, in the present embodiment, the same mark as a mark printed on the end separator is printed on the front separator, and this indicates that the end separator is associated with the front separator. That is, this indicates that the printed matter corresponding to the end separator is associated with the printed matter corresponding to the front separator.

In the example in FIG. 8, the mark printed on the end separator 92 of the printed matter 50-1 and the mark printed on the front separator 93 of the printed matter 50-2 are the marks 92a, which are identical with each other. Furthermore, the mark printed on the end separator 94 of the printed matter 50-2 and the mark printed on the front separator 95 of the printed matter 50-3 are the marks 94a, which are identical with each other. Furthermore, the mark printed on the end separator 96 of the printed matter 50-3 and the mark printed on the front separator 97 of the printed matter 50-4 are the marks 96a, which are identical with each other.

Furthermore, the mark 92a, the mark 94a, and the mark 96a are different from each other. In other words, the mark 92a, the mark 94a, and the mark 96a are images which are printed in different patterns.

Therefore, in the example in FIG. 8, it is found that the end separator 92 of the printed matter 50-1 is associated with the front separator 93 of the printed matter 50-2. That is, in the example in FIG. 8, it is found that a printed matter to be collected subsequent to the printed matter 50-1 is the printed matter 50-2. In other words, it can be found that the first page of the printed matter 50-2 is a page subsequent to the final page of the printed matter 50-1.

Similarly, in the example in FIG. 8, it is found that the end separator 94 of the printed matter 50-2 is associated with the front separator 95 of the printed matter 50-3 and the printed matter 50-2 is associated with the printed matter 50-3. Furthermore, in the example in FIG. 8, it is found that the end separator 96 of the printed matter 50-3 is associated with the front separator 97 of the printed matter 50-4 and the printed matter 50-3 is associated with the printed matter 50-4.

As described above, in the present embodiment, the position of the printed matter to be output from each of the printers 400 in the entire printed matter is represented by the image printed on the separator. This enables one to visually recognize which printed matter is to be collected next.

The examples illustrated in FIGS. 7 and 8 are not limited to a case where the plurality of printers 400 outputs the printed matters. The present embodiment can be applied to a single printer 400, provided that it includes a plurality of sheet ejection openings.

In this case, when the printed matters are output from the plurality of sheet ejection openings based on the print data, it is preferable to print an end separator of a first printed matter output from a certain sheet ejection opening, a front separator of a second printed matter of which a start page is a page subsequent to the final page of the first printed matter, and an image that associates the first printed matter and the second printed matter.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid-state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application No. 2018-039121, filed on Mar. 5, 2018 in the Japan Patent Office, the entire disclosure of which is incorporated herein by reference.

REFERENCE SIGNS LIST

100 Information processing system
200 Information processing apparatus
210 Print management unit
220 Distribution processing unit
230 Alternative processing unit
240 Separator data generation unit
250 Printer management unit
251 Printer information
252 Print state information
260 Output unit
270 Storage unit
280 Display unit
300 Server
400 Printer

The invention claimed is:

1. An information processing apparatus comprising:
processing circuitry configured to
allocate a plurality of print data sets to a plurality of image forming apparatuses, respectively, the plurality of print data sets being obtained by dividing one print data set;
generate, for each of the plurality of image forming apparatuses, print data for a separator, the print data for the separator including
management information including information regarding a particular print data set among the plurality of print data sets,
information regarding a particular image forming apparatus among the plurality of image forming apparatuses to which the particular print data set is allocated, and
information regarding which of the plurality of image forming apparatuses has been allocated a previous print data set compared to the particular print data set and a subsequent data set compared to the particular print data set;
detect, for each of the plurality of print data sets, interruption of printing of the print data set in the image forming apparatus;
calculate a number of unprinted pages of print data not printed yet of the print data set in the interrupted image forming apparatus;
allocate, in response to detection of the interruption of printing of the print data set, the print data not printed yet of the print data set to another one of the plurality of image forming apparatuses, the another one of the plurality of image forming apparatuses being different from the image forming apparatus to which the print data set in which the interruption is detected is allocated;
generate print data for a first alternative separator including alternative information regarding the print data which is not printed yet and the number of unprinted pages;
generate print data for a second alternative separator including alternative notification information, including the number of unprinted pages, to notify that the print data not printed yet has been printed by the another one of the plurality of image forming apparatuses; and
delete, in the interrupted image forming apparatus, the print data corresponding to the print data not printed yet of the print data set, and output circuitry configured to
output, for each of the plurality of image forming apparatuses, the particular print data set and the print data for the separator to the particular image forming apparatus to which the particular print data set is allocated;
output the print data not printed yet and the print data for the first alternative separator including the alternative information, to the another one of the plurality of image forming apparatuses, and
output the print data only for the second alternative separator including the alternative notification information, in response to detection of restoration of the image forming apparatus to which the print data set in which the interruption is detected is allocated, to the image forming apparatus of which the restoration is detected,
wherein the print data generated for the second alternative separator includes alternative notification information regarding the print data not printed yet by the image forming apparatus, but by printed by the another one of the plurality of image forming apparatuses.

2. The information processing apparatus of claim 1, wherein the management information includes information for specifying a first image forming apparatus among the plurality of image forming apparatuses to which a first print data set among the plurality of print data sets is allocated, the first print data set being subsequent to a second print data set among the plurality of print data sets, which is allocated to a second image forming apparatus among the plurality of image forming apparatuses.

3. The information processing apparatus of claim 2, wherein the management information includes information for specifying a third image forming apparatus among the plurality of image forming apparatuses to which a third print data set among the plurality of print data sets is allocated, the third print data set being immediately prior to the second print data set.

4. The information processing apparatus of claim 1, wherein the management information includes a visual indicator, the visual indicator including a symbol, indicating a relationship of the particular print data set to the plurality of print data sets.

5. The information processing apparatus of claim 4, wherein the symbol corresponds to separators of adjacent data sets to the plurality of print data sets.

6. The information processing apparatus of claim 1, wherein the first alternative separator is output as a front separator for the print data not printed yet.

7. An information processing apparatus comprising:
processing circuitry configured to
allocate a plurality of print data sets to a plurality of sheet ejection openings, respectively, the plurality of print data sets being obtained by dividing one print data set, and
generate, for each of the plurality of sheet ejection openings, print data for a separator, the print data for the separator including
management information including information regarding a particular print data set among the plurality of print data sets,
information regarding a particular sheet ejection opening among the plurality of sheet ejection openings to which the particular print data set is allocated, and
information regarding which of the plurality of sheet print data set openings has been allocated a previous print data set compared to the particular print data set and a subsequent data set compared to the particular print data set;
detect, for each of the plurality of print data sets, interruption of printing of the print data set in the sheet ejection openings;
calculate a number of unprinted pages of print data not printed yet of the print data set in the interrupted sheet ejection opening;
allocate, in response to detection of the interruption of printing of the print data set, the print data not printed yet of the print data set to another one of the plurality of sheet ejection openings, the another one of the plurality of sheet ejection openings being different from the sheet ejection opening to which the print data set in which the interruption is detected is allocated;
generate print data for a first alternative separator including alternative information regarding the print data which is not printed yet and the number of unprinted pages;
generate print data for a second alternative separator including alternative notification information, including the number of unprinted pages, to notify that the print data not printed yet has been printed by the another one of the plurality of sheet ejection openings; and
delete, in the interrupted sheet ejection opening, the print data corresponding to the print data not printed yet of the print data set, and output circuitry configured to
output, for each of the plurality of sheet ejection openings, the particular print data set and the print data for the separator to the particular sheet ejection opening to which the particular print data set is allocated;
output the print data not printed yet and the print data for the first alternative separator including the alternative information, to the another one of the plurality of sheet ejection openings; and
output the print data only for the second alternative separator including the alternative notification information, in response to detection of restoration of the sheet ejection opening to which the print data set in which the interruption is detected is allocated, to the sheet ejection opening of which the restoration is detected,
wherein the print data generated for the second alternative separator includes alternative notification information regarding the print data not printed by the sheet ejection opening, but by printed by the another one of the plurality of the sheet ejection openings.

8. An information processing system comprising:
a plurality of image forming apparatuses; and
an information processing apparatus, wherein
the information processing apparatus includes,
allocate a plurality of print data sets to a plurality of image forming apparatuses, respectively, the plurality of print data sets being obtained by dividing one print data set;
generate, for each of the plurality of image forming apparatuses, print data for a separator, the print data for the separator including
management information including information regarding a particular print data set among the plurality of print data sets,
information regarding a particular image forming apparatus among the plurality of image forming apparatuses to which the particular print data set is allocated, and
information regarding which of the plurality of image forming apparatuses has been allocated a previous print data set compared to the particular print data set and a subsequent data set compared to the particular print data set;
detect, for each of the plurality of print data sets, interruption of printing of the print data set in the image forming apparatus;
calculate a number of unprinted pages of print data not printed yet of the print data set in the interrupted image forming apparatus;
allocate, in response to detection of the interruption of printing of the print data set, print data not printed yet of the print data set to another one of the plurality of image forming apparatuses, the another one of the plurality of image forming apparatuses being different from the image forming apparatus to which the print data set in which the interruption is detected is allocated;
generate print data for a first alternative separator including alternative information regarding the print data which is not printed yet and the number of unprinted pages;
generate print data for a second alternative separator including alternative notification information, including the number of unprinted pages, to notify that the print data not printed yet has been printed by the another one of the plurality of image forming apparatuses; and
delete, in the interrupted image forming apparatus, the print data corresponding to the print data not printed yet of the print data set, and output circuitry configured to
output, for each of the plurality of image forming apparatuses, the particular print data set and the print data for the separator to the particular image forming apparatus to which the particular print data set is allocated;
output the print data not printed yet and the print data for the first alternative separator including the alternative-information, to the another one of the plurality of image forming apparatuses; and output the print data only for the second alternative separator including the alternative notification information, in response to detection of restoration of the image forming apparatus to which the print data set in which the interruption is detected is allocated, to the image forming apparatus of which the restoration is detected, wherein the print data generated for the second alternative separator includes alternative notification information regarding the print data not printed by the image forming apparatus, but by printed by the another one of the plurality of image forming apparatuses.

9. An information processing method performed by a computer, the method comprising:

allocating a plurality of print data sets to a plurality of image forming apparatuses, the plurality of print data sets being obtained by dividing one print data set;

generating, for each of the plurality of image forming apparatuses, print data for a separator, the print data for the separator including management information including information regarding a particular print data set among the plurality of print data sets, information regarding a particular image forming apparatus among the plurality of image forming apparatuses to which the particular print data set is allocated, and information regarding which of the plurality of image forming apparatuses has been allocated a previous print data set compared to the particular print data set and a subsequent data set compared to the particular print data set;

outputting, for each of the plurality of image forming apparatuses, the particular print data set and the print data for the separator to the particular image forming apparatus to which the particular print data set is allocated;

detecting, for each of the plurality of print data sets, interruption of printing of the print data set in the image forming apparatus;

calculating, for the interrupted image forming apparatus, a number of unprinted pages of print data not printed yet of the print data set in the interrupted image forming apparatus;

allocating, in response to detection of the interruption of printing of the print data set, the print data not printed yet of the print data set to another one of the plurality of image forming apparatuses, the another one of the plurality of image forming apparatuses being different from the image forming apparatus to which the print data set in which the interruption is detected is allocated, the print data generated for the separator includes alternative information regarding the print data not printed yet;

outputting the print data not printed yet and the print data for the separator including the alternative information, to the another one of the plurality of image forming apparatuses;

generating print data for a first alternative separator including alternative information regarding the print data which is not printed yet and the number of unprinted pages;

generating print data for a second alternative separator including alternative notification information, including the number of unprinted pages, to notify that the print data not printed yet has been printed by the another one of the plurality of image forming apparatuses;

deleting, in the interrupted image forming apparatus, the print data corresponding to the print data not printed yet of the print data set; and outputting, in response to detection of restoration of the image forming apparatus to which the print data set in which the interruption is detected is allocated, the print data only for the second alternative separator including the alternative notification information to the image forming apparatus of which the restoration is detected.

10. A non-transitory storage medium storing an information processing program for, when executed by a computer, causing the computer to perform the method of claim 9.

* * * * *